(12) United States Patent
Watanabe

(10) Patent No.: US 12,560,779 B2
(45) Date of Patent: Feb. 24, 2026

(54) OPTICAL SYSTEM, OPTICAL APPARATUS, AND IMAGE PICKUP APPARATUS

(71) Applicant: CANON KABUSHIKI KAISHA, Tokyo (JP)

(72) Inventor: Tatsuro Watanabe, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 910 days.

(21) Appl. No.: 17/854,059

(22) Filed: Jun. 30, 2022

(65) Prior Publication Data

US 2023/0031845 A1     Feb. 2, 2023

(30) Foreign Application Priority Data

Jul. 16, 2021    (JP) ................................. 2021-117655

(51) Int. Cl.
*G02B 9/60*      (2006.01)
*G02B 7/09*      (2021.01)
*G03B 3/10*      (2021.01)

(52) U.S. Cl.
CPC ................. *G02B 9/60* (2013.01); *G02B 7/09* (2013.01); *G03B 3/10* (2013.01)

(58) Field of Classification Search
None
See application file for complete search history.

(56) References Cited

U.S. PATENT DOCUMENTS

| | | | |
|---|---|---|---|
| 4,971,428 A | 11/1990 | Moskovich | |
| 11,822,096 B2 * | 11/2023 | Watanabe | .......... G02B 17/0808 |
| 2017/0219642 A1 | 8/2017 | Maier | |
| 2021/0141240 A1 | 5/2021 | Watanabe | |

FOREIGN PATENT DOCUMENTS

| | | |
|---|---|---|
| JP | 2014-074783 A | 4/2014 |
| JP | 2018-072457 A | 5/2018 |
| WO | 2012/108137 A1 | 8/2012 |

OTHER PUBLICATIONS

Notice of Reasons for Refusal issued by the Japanese Patent Office on Jun. 3, 2025 in corresponding JP Patent Application No. 2021-117655, with English translation.

* cited by examiner

*Primary Examiner* — Stephone B Allen
*Assistant Examiner* — Tamara Y. Washington
(74) *Attorney, Agent, or Firm* — Carter, DeLuca & Farrell LLP

(57)     ABSTRACT

An optical system includes a first unit fixed during focusing, a second unit configured to move during focusing, and a third unit fixed during focusing on an image side of the second unit. The first unit includes a first optical element having a first reflective surface that has a concave shape toward an object side, and a second optical element having a second reflective surface that has a convex shape toward an image side. Light incident on the optical system from an object is reflected by the first reflective surface, thereafter is reflected by the second reflective surface, and thereafter passes through the second unit. A predetermined inequality is satisfied.

18 Claims, 12 Drawing Sheets

OPTICAL SYSTEM, OPTICAL APPARATUS, AND IMAGE PICKUP APPARATUS

BACKGROUND OF THE INVENTION

Field of the Invention

The present invention relates to an optical apparatus suitable for an imaging optical system for use with an image pickup apparatus and an interchangeable lens.

Description of the Related Art

A catadioptric imaging optical system having a catoptric system and a dioptric system has been known as a telephoto type imaging optical system having a long focal length. Japanese Patent Laid-Open Nos. ("JPs") 2018-72457 and 2014-74783 disclose inner focus type imaging optical systems as such catadioptric imaging optical systems having a small size, reduced weight, large aperture ratio, and auto-focus function.

However, the catoptric configuration in each of the imaging optical systems disclosed in JPs 2018-72457 and 2014-74783 cannot sufficiently correct a curvature of field.

SUMMARY OF THE INVENTION

The present invention provides a small and lightweight optical system having a large aperture ratio, which can sufficiently correct a curvature of field.

An optical system according to one aspect of the present invention includes a first unit fixed during focusing, a second unit configured to move during focusing, and a third unit fixed during focusing on an image side of the second unit. The first unit includes a first optical element having a first reflective surface that has a concave shape toward an object side, and a second optical element having a second reflective surface that has a convex shape toward the image side. Light incident on the optical system from an object is reflected by the first reflective surface, thereafter is reflected by the second reflective surface, and thereafter passes through the second unit, the following inequalities are satisfied:

$$nM1 \leq 1.690$$

$$0.440 \leq L/f \leq 0.800$$

where nM1 is a refractive index of the first optical element for d-line, L is a distance on an optical axis from a surface closest to the object of the optical system to the image plane, and f is a focal length of the optical system.

An optical apparatus and an image pickup apparatus each having the above optical system also constitute another aspect of the present invention.

Further features of the present invention w % ill become apparent from the following description of exemplary embodiments with reference to the attached drawings.

DESCRIPTION OF THE EMBODIMENTS

Referring now to the accompanying drawings, a description will be given of embodiments according to the present invention.

FIGS. 1, 3, 5, 7, and 9 illustrate configurations of catadioptric systems (simply referred to as an optical system hereinafter) L0 according to Examples 1 to 5 in an in-focus state (on an object) at infinity, respectively. The optical system L0 according to each example is used as an imaging optical system in an interchangeable lens apparatus and an image pickup apparatus such as a digital video camera, a digital still camera, a broadcast camera, a film-based camera, a surveillance camera, or an observation optical system, a projection optical system, and an exposure optical system in an optical apparatus such as an observation apparatus, a projector, and an exposure apparatus. The optical system is held by a holding member such as a lens barrel, but the holding member is not illustrated in each figure.

In each figure, a left side is an object side and a right side is an image side. Where i represents an order of units through which light from the object side passes, Li represents an i-th unit. A "unit" is a group of one or more optical elements (a lens or an optical element having a reflective surface) that are integrally immovable (fixed) or configured to move during focusing. The optical system L0 according to each example includes a first unit L1 that is fixed during focusing, and a second unit L2 configured to move during focusing. The unit may include a diaphragm (aperture stop).

IP represents an image plane, and an imaging plane of an image sensor (photoelectric conversion element), such as a CCD sensor and a CMOS sensor, or a photosensitive plane of a film is placed on the image plane IP.

Figure 1:
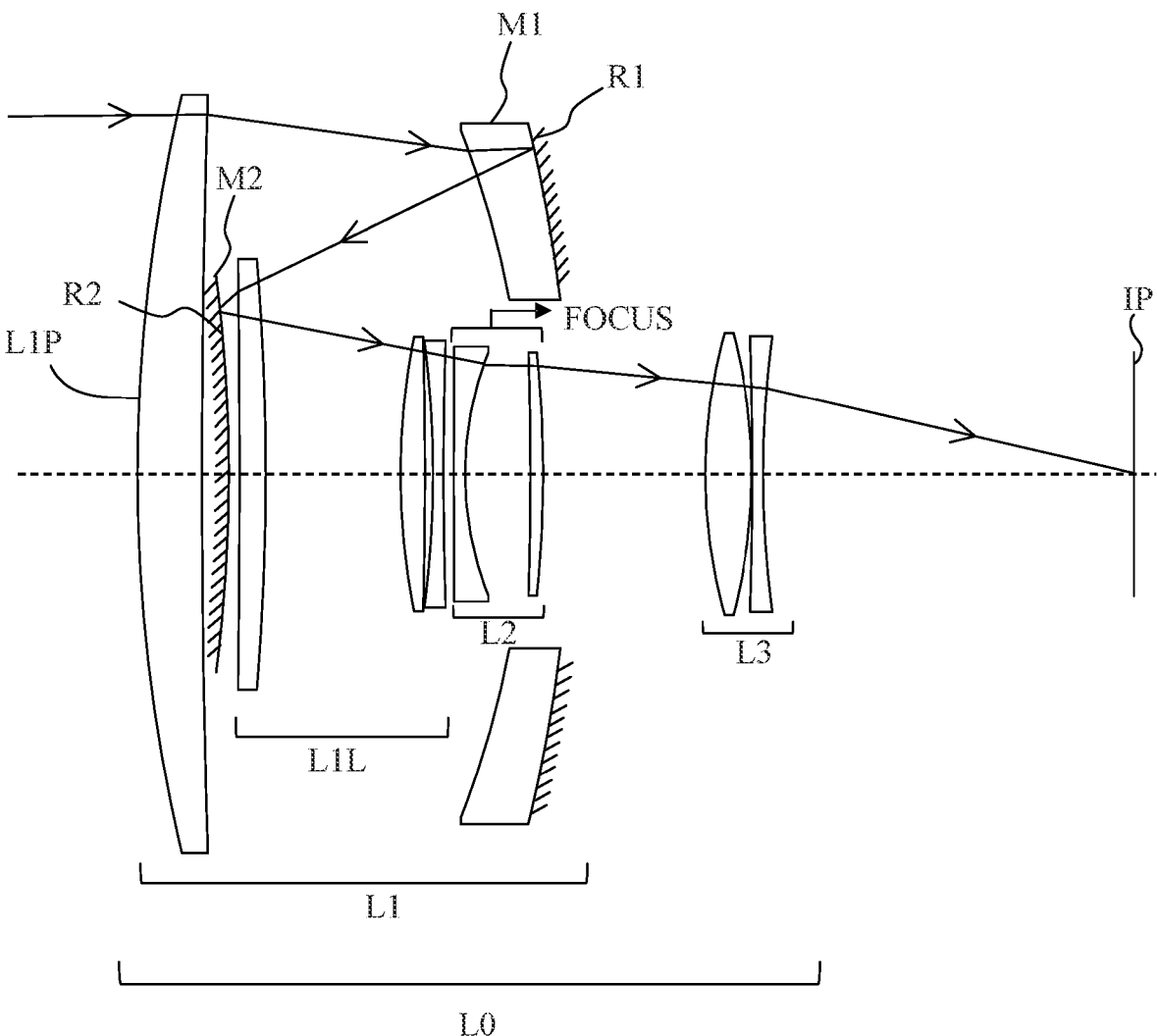
FIG. 1 is a sectional view of an optical system according to Example 1.
Figure 2A:
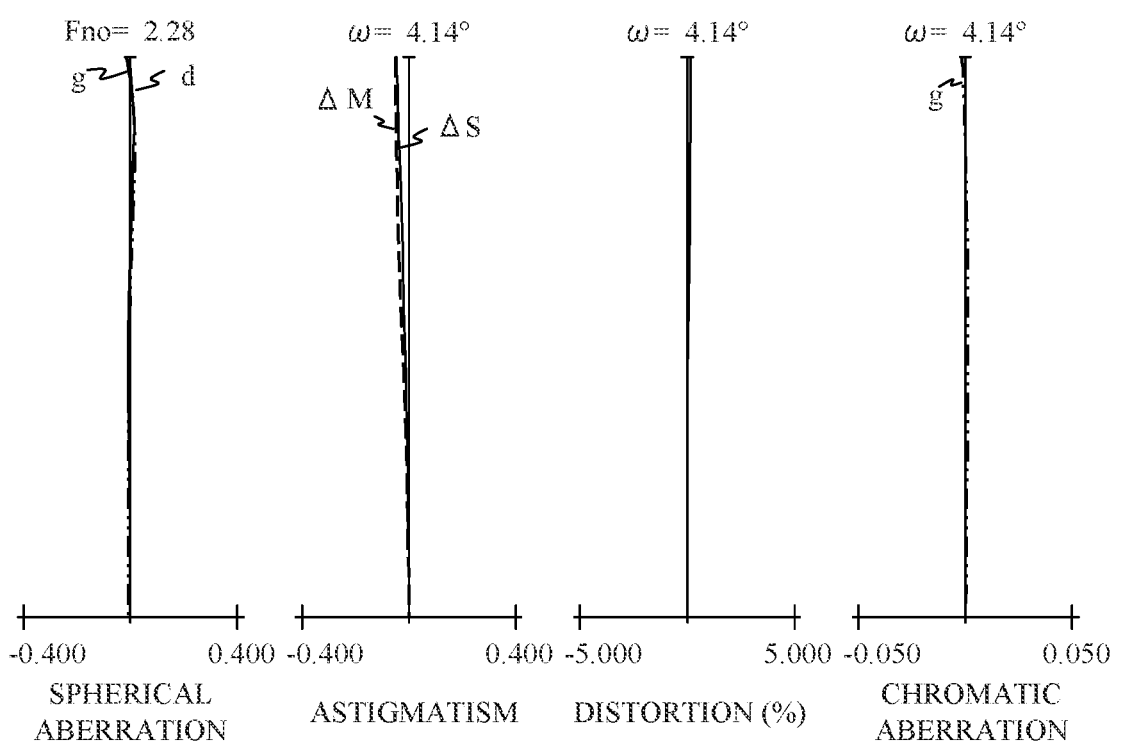
FIGS. 2A and 2B are longitudinal aberration diagrams of the optical system according to Example 1 in in-focus states on an object at infinity (infinity object) and a short-distance object.
Figure 2B:
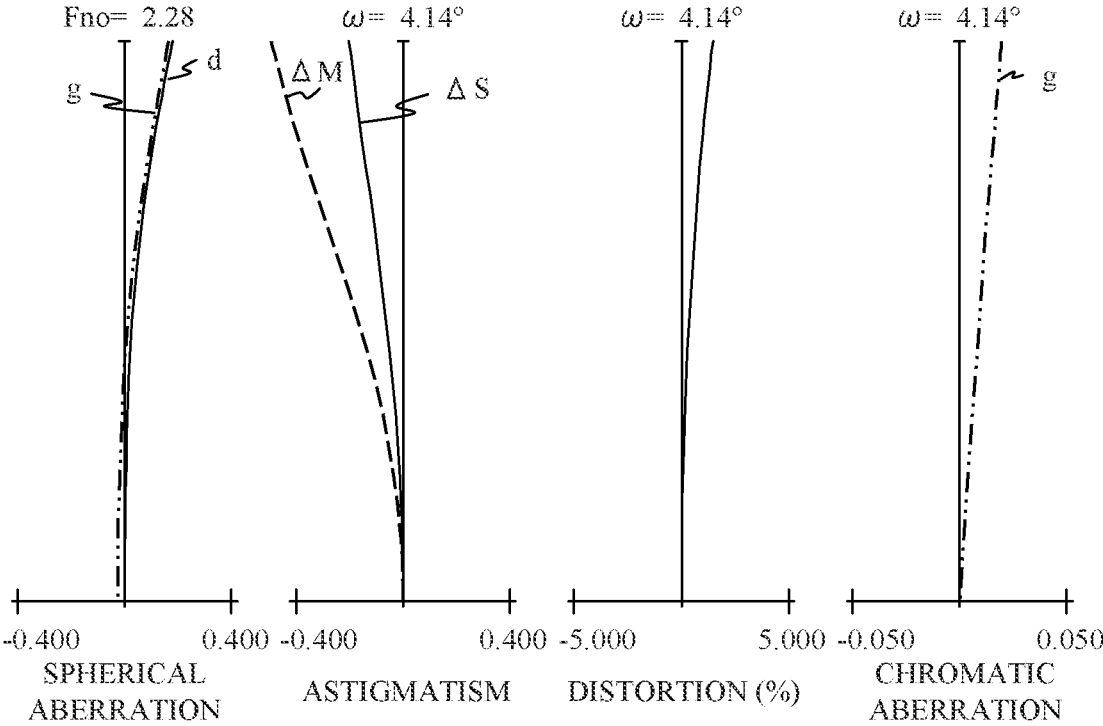
Figure 3:
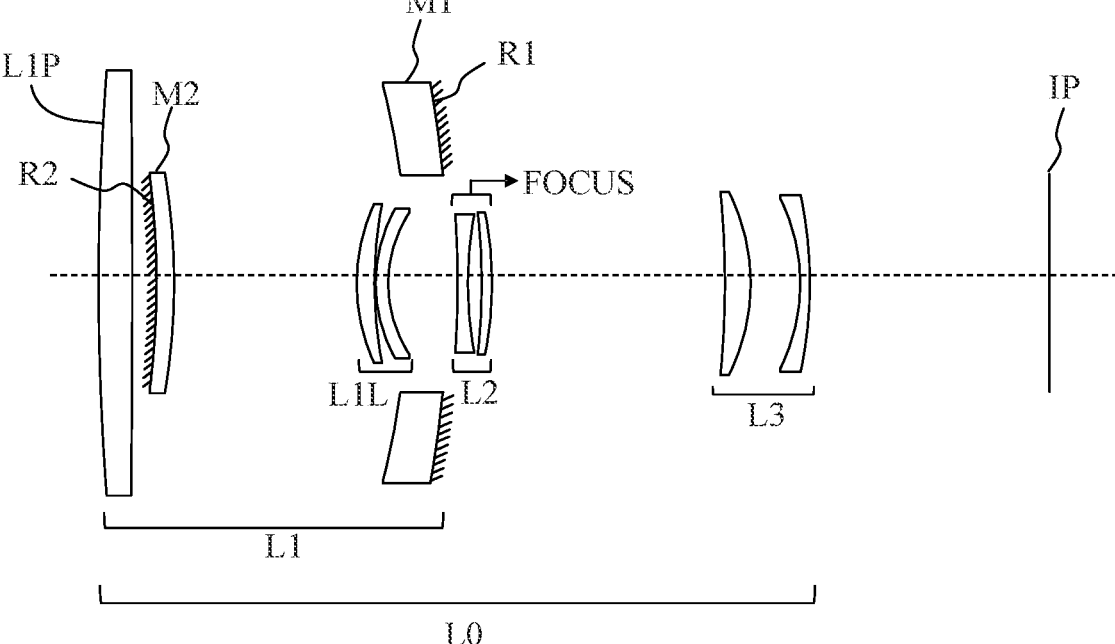
FIG. 3 is a sectional view of an optical system according to Example 2.
Figure 4A:
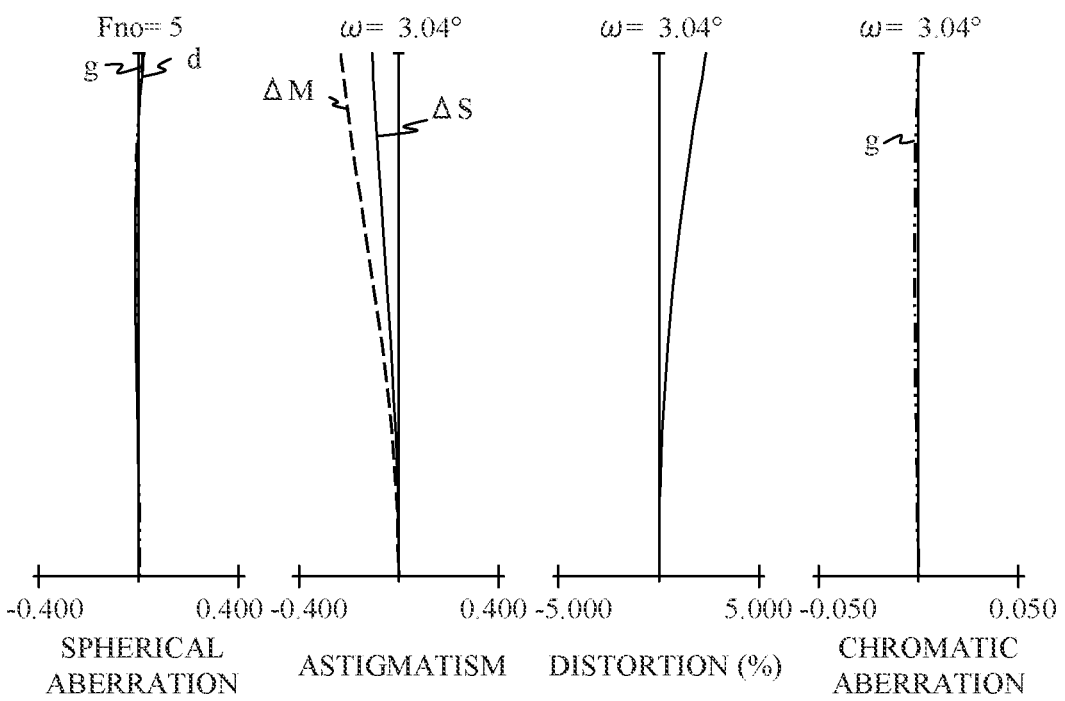
FIGS. 4A and 4B are longitudinal aberration diagrams of the optical system according to Example 2 in in-focus states on an object at infinity and a short-distance object.
Figure 4B:
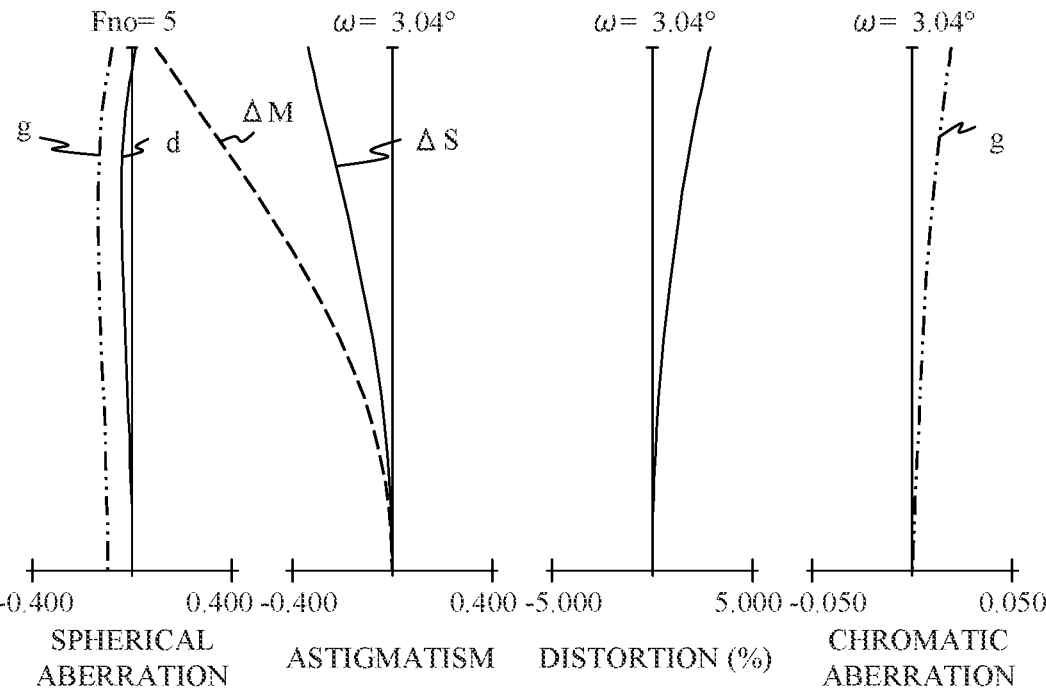
Figure 5:
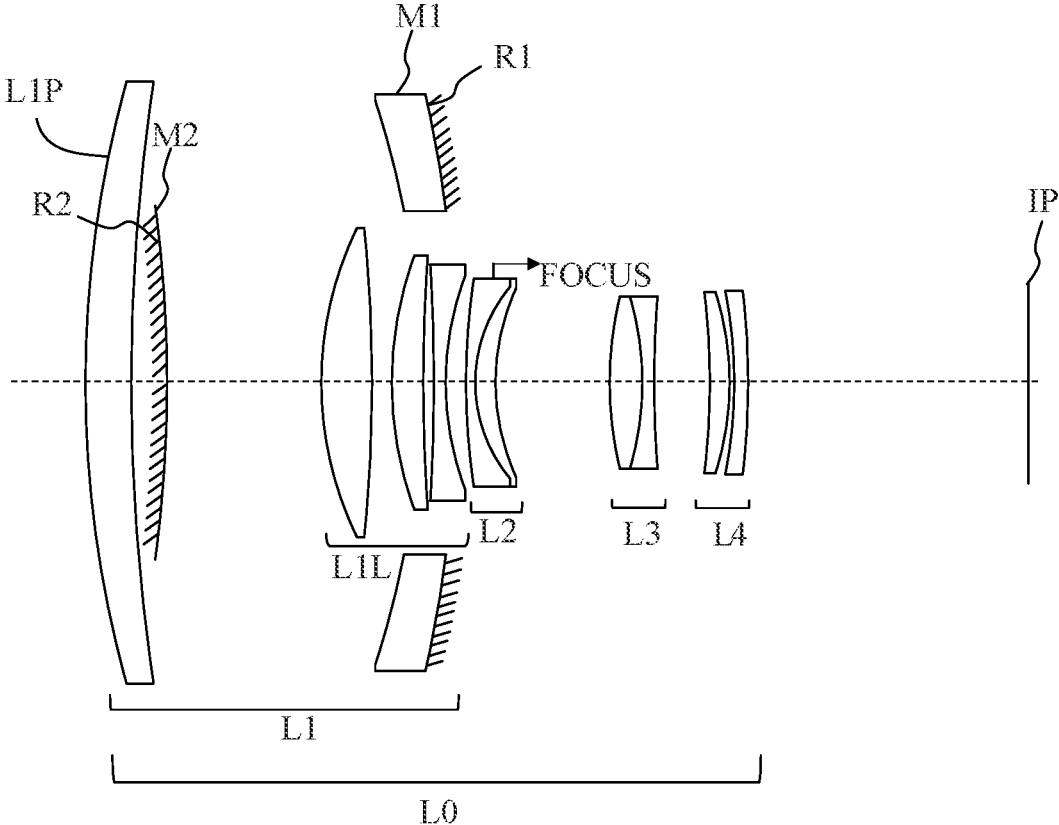
FIG. 5 is a sectional view of an optical system according to Example 3.
Figure 6A:
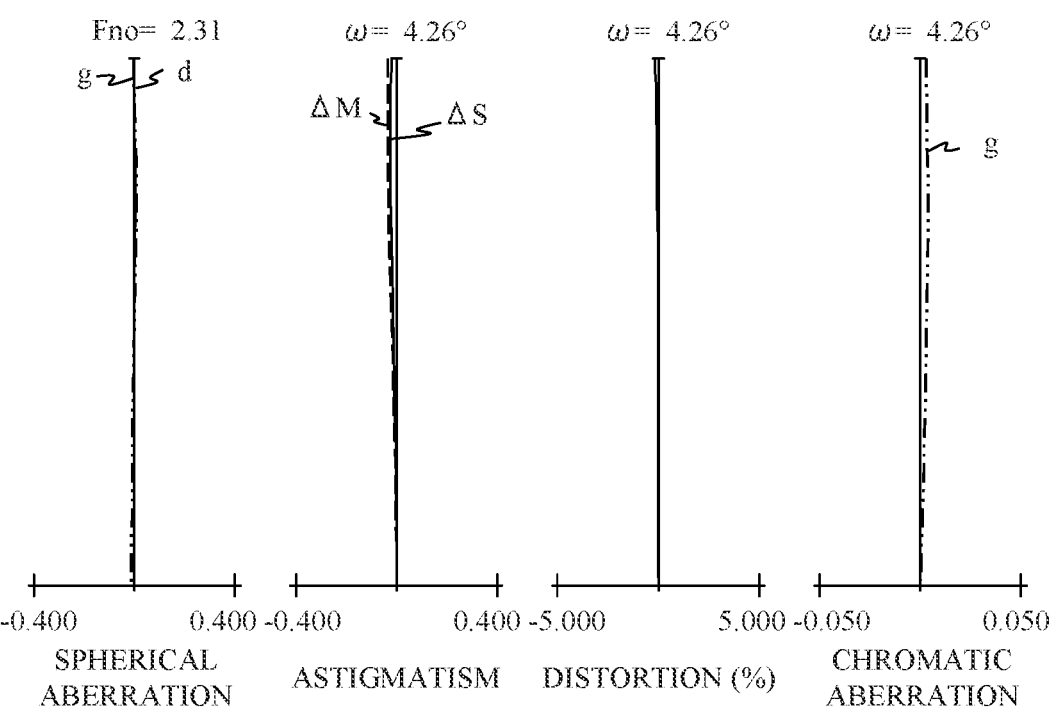
FIGS. 6A and 6B are longitudinal aberration diagrams of the optical system according to Example 3 in in-focus states on an object at infinity and a short-distance object.
Figure 6B:
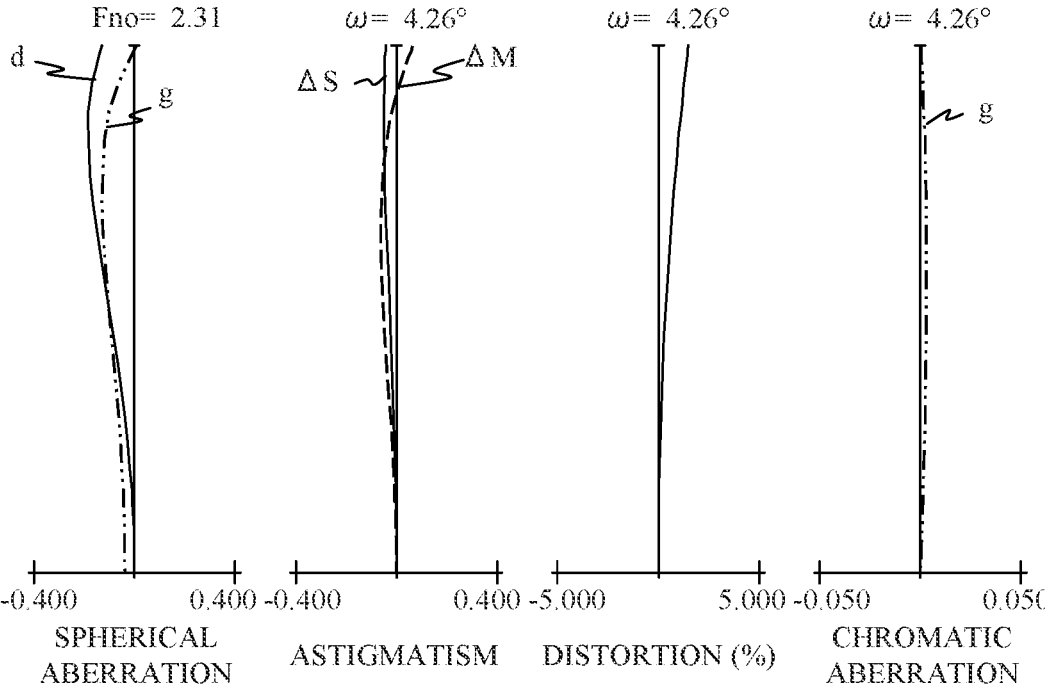
Figure 7:
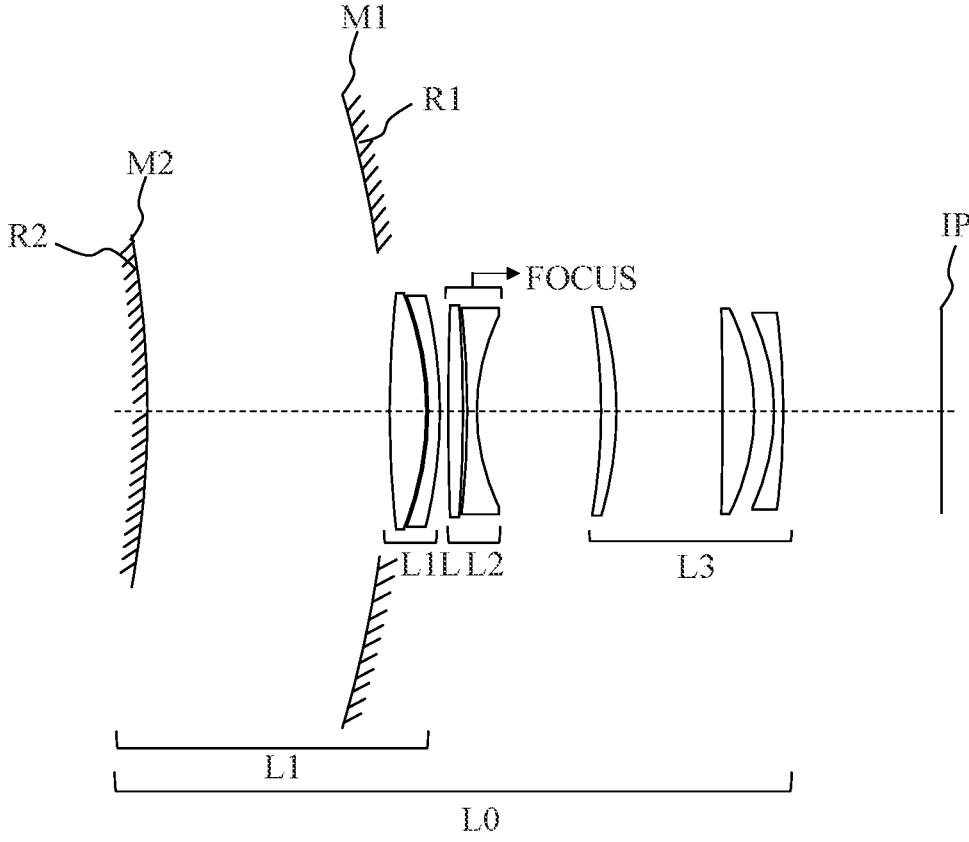
FIG. 7 is a sectional view of an optical system according to Example 4.
Figure 8A:
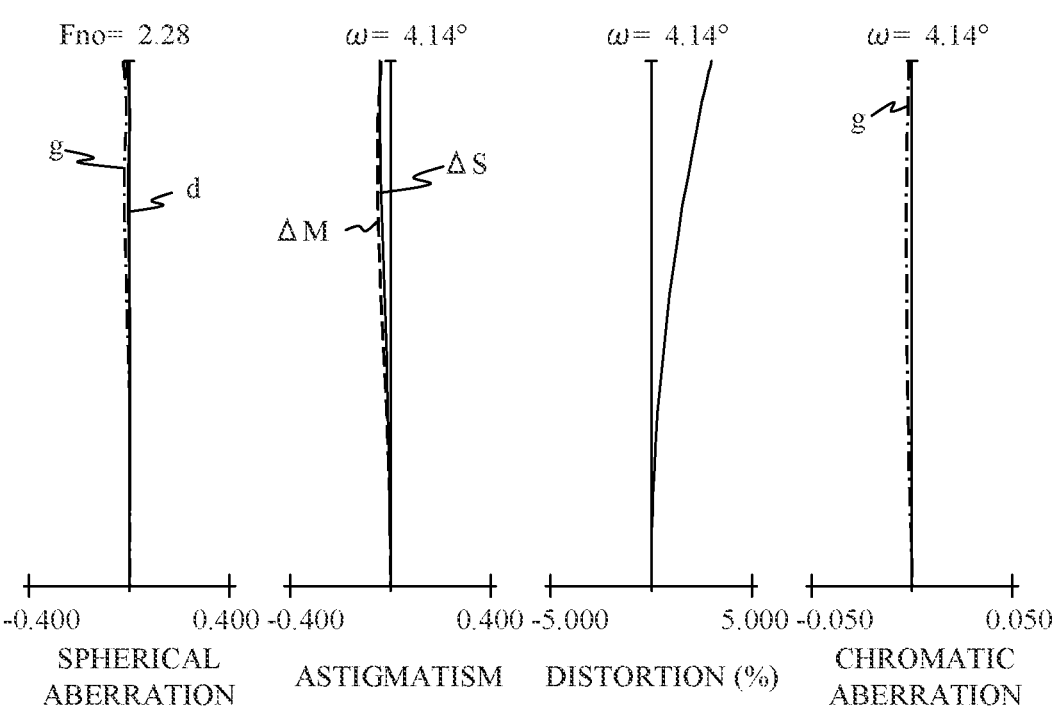
FIGS. 8A and 8B are longitudinal aberration diagrams of the optical system according to Example 4 in in-focus states on an object at infinity and a short-distance object.
Figure 8B:
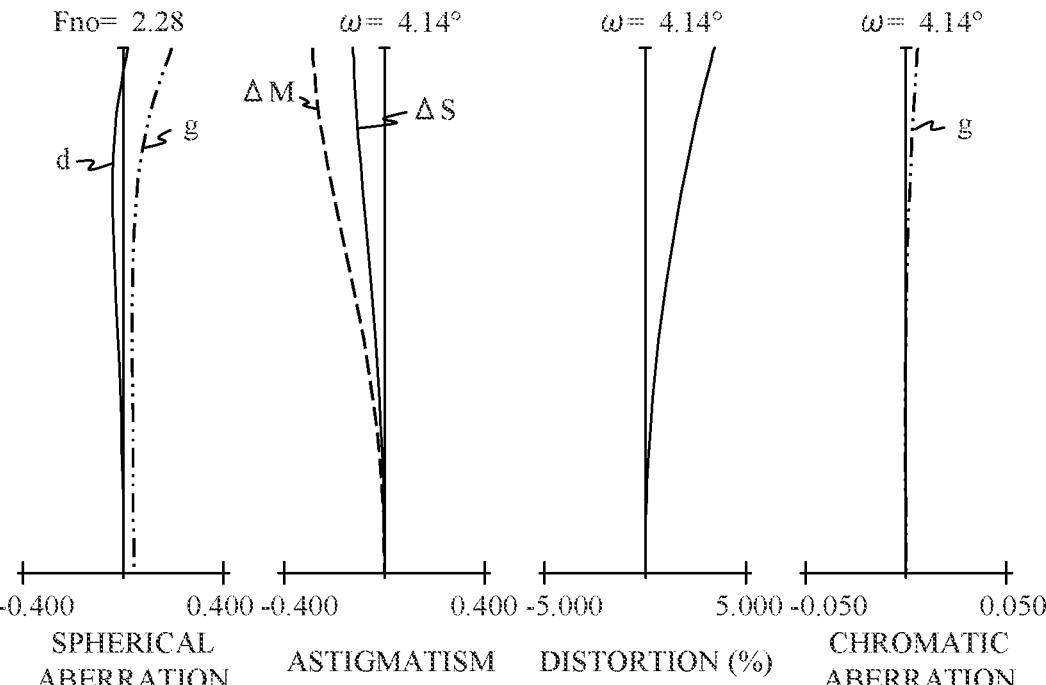
Figure 9:
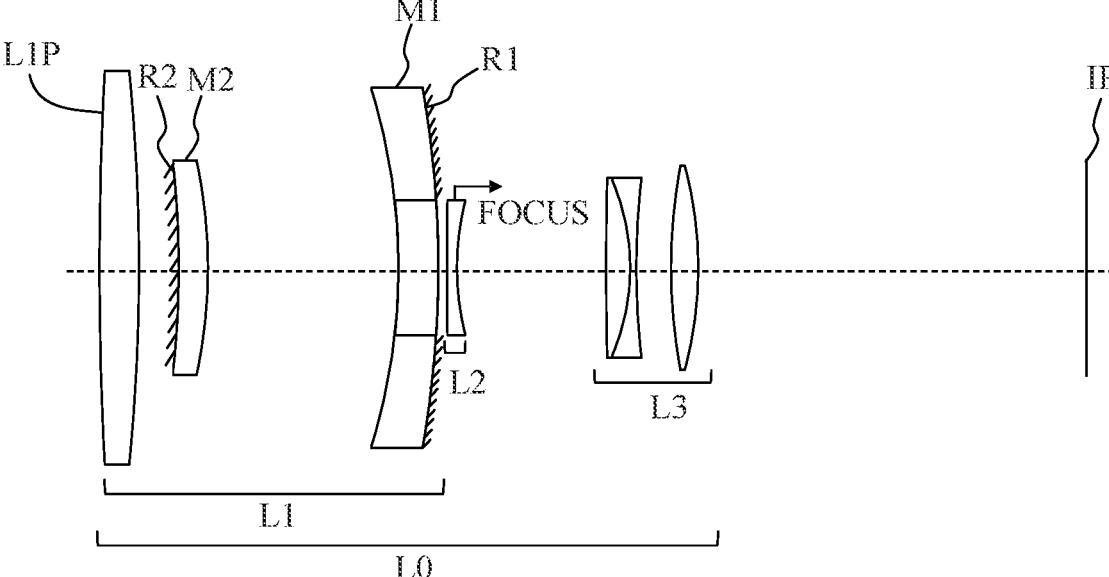
FIG. 9 is a sectional view of an optical system according to Example 5.
Figure 10A:
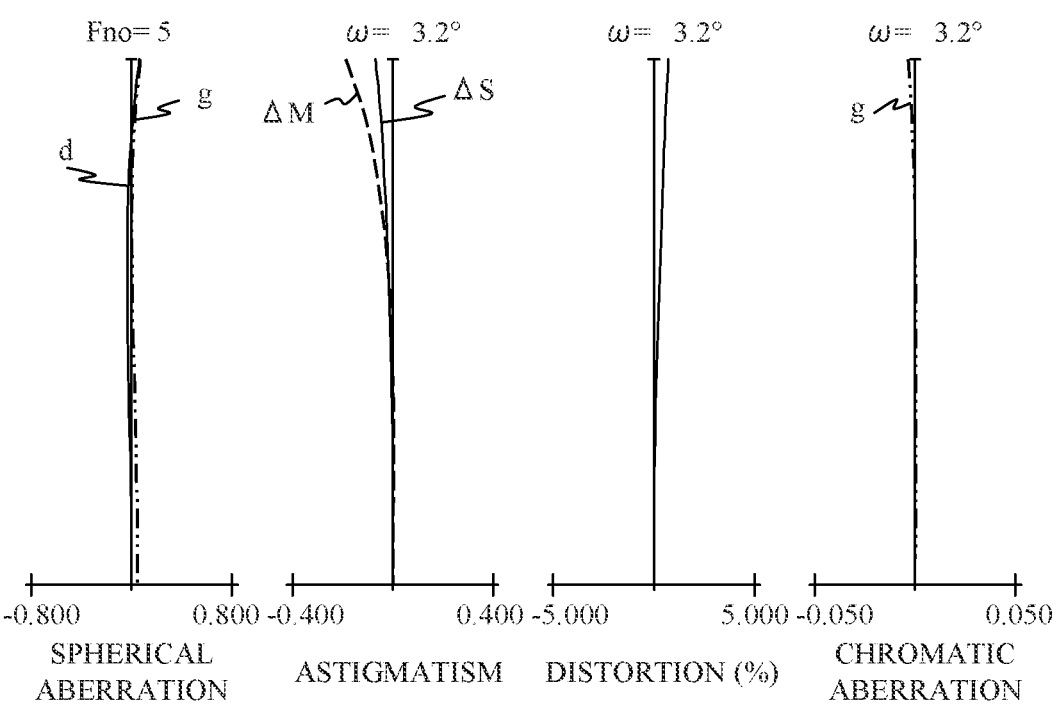
FIGS. 10A and 10B are longitudinal aberration diagrams of the optical system according to Example 5 in in-focus states on an object at infinity and a short-distance object.
Figure 10B:
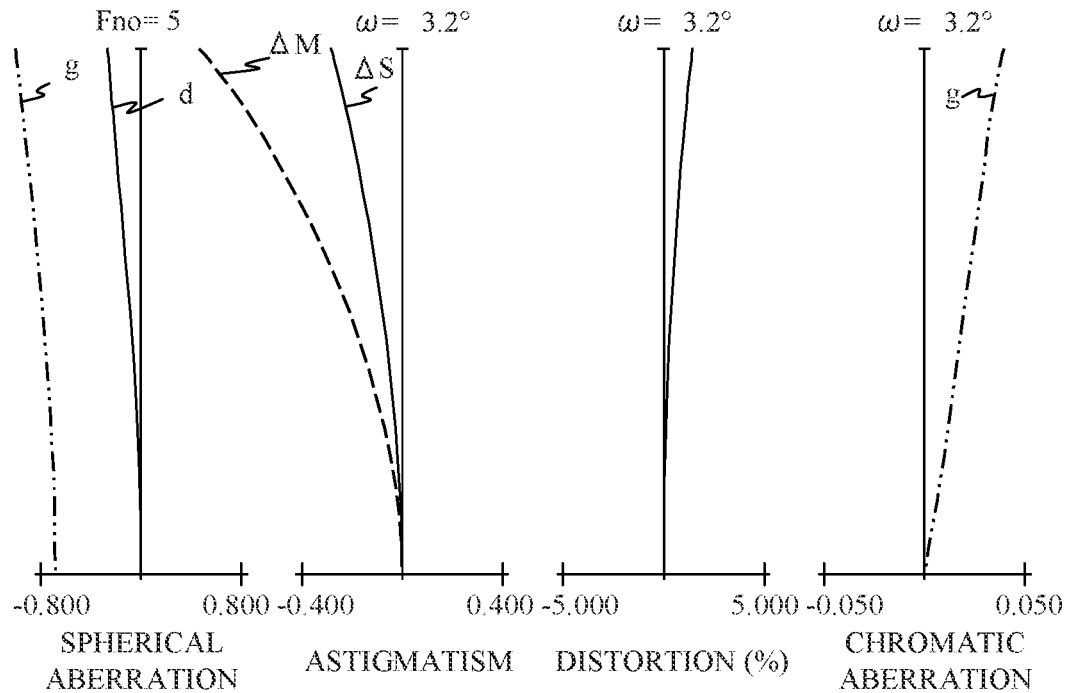

A top of FIG. 1 that illustrates the optical system L0 according to Example 1 illustrates an optical path of light incident from the object and reaching the image plane IP. Although not illustrated, an optical path in the optical system L0 according to another example is similar to that illustrated in FIG. 1.

The first unit L1 includes, in light entering order from the object side, a first optical element M1 having a first reflective surface R1 having a concave shape toward the object side, and a second optical element M2 having a second reflective surface R2 having a convex shape toward the image side. The first optical element M1 and the second optical element M2 may include lenses having the first reflective surface R1 and the second reflective surface R2 on the back surface sides, respectively. The first unit L1 may include a lens subunit that transmits light traveling from the second reflective surface R2 to the second unit L2. Thus, light incident on the optical system from the object is reflected by the first reflective surface R1, thereafter is reflected by the second reflective surface R2, and thereafter passes through the second unit L2.

An arrow labeled "Focus" illustrates a moving direction of the second unit L2, which is moved during focusing from an object at infinity to a short-distance object. In the optical system L0 according to each example, the second unit L2 is moved to the image side during focusing from the object at infinity to the short-distance object.

Numerical examples 1 to 5 corresponding to Examples 1 to 5 follow a detailed description according to Examples 1 to 5. FIGS. 2A, 2B, 4A, 4B, 6A, 6B, 8A, 8B, 10A, and 10B illustrate longitudinal aberrations (spherical aberration, astigmatism, distortion, and chromatic aberration) of the optical systems L0 according to Examples 1 to 5 (numerical examples 1 to 5) in the in-focus states on the object at infinity and the short-distance object, respectively. The in-focus state on the short-distance object is a state in which the object at 3 m is in focus. In the spherical aberration diagram, Fno represents an F-number, a solid line illustrates a spherical aberration for the d-line (wavelength 587.6 nm), and an alternate long and two short dashes line illustrates a spherical aberration for the g-line (wavelength 435.8 nm). In the astigmatism diagram, a solid line ΔS illustrates a curvature of field in a sagittal image plane, and a broken line ΔM illustrates a curvature of field in a meridional image plane. The distortion diagram illustrates a distortion amount for the d-line. The chromatic aberration diagram illustrates a lateral chromatic aberration amount for the g-line. ω is a half angle of view (°) calculated by paraxial calculation.

In the optical system L0 according to each example, assume that nM1 is a refractive index of the first optical element M1 for the d-line, L is an overall length of the optical system L0 (a distance on the optical axis from a surface closest to the object to the image plane IP), and f is a focal length of the optical system L0. At this time, the optical system L0 satisfies inequalities of the following expressions (1) and (2). The refractive index nM1 of the first optical element M1 provided with the first reflective surface R1 on the back surface of the lens indicates the refractive index of the lens, and the refractive index nM1 of the first optical element M1 consisting of the first reflective surface R1 is 1.

$$NM1 \leq 1.690 \tag{1}$$

$$0.440 \leq L/f \leq 0.800 \tag{2}$$

The expression (1) illustrates a condition on a proper refractive index of the first optical element M 1. When an inner focus type is used for a catadioptric system, a focus lens subunit must be small and a mechanism for driving the focus lens subunit needs to be simple in order to reduce the size and weight of the entire optical system. Thus, in each example, the second unit L2 as the focus lens subunit is disposed on the image side of the second optical element M2. This configuration can easily reduce the effective diameter of the focus lens subunit to reduce the size and weight of the focus lens subunit, that is, reduce the size and weight of the entire optical system L0. The effective diameter is a diameter of a lens in a range through which on-axis and off-axis rays reaching the image plane pass.

If the overall length of the optical system L0 is shortened, the positive Petzval sum of the first reflective surface R1 and the second reflective surface R2 becomes large, and it becomes difficult to correct the curvature of field in the entire optical system L0. In the case where the first optical element M1 is an optical element having a reflective surface provided on the back surface of the lens, the refractive surface of the first optical element M1 acts as a negative lens, the refractive index nM1 of the first optical element M1 may be made small so as to reduce the Petzval sum of the entire optical system L0. Thereby, the curvature of field can be satisfactorily corrected while the overall length of the optical system L0 is shortened. If nM1 is higher than the upper limit of the expression (1), the Petzval sum of the refractive surface of the first optical element M1 becomes large and it becomes difficult to correct the curvature of field.

The expression (2) illustrates a condition on a proper relationship between the overall length and the focal length of the optical system L0. When L/f becomes lower than the lower limit of the expression (2), the absolute value of the power of the second reflective surface R2 becomes large, and the Petzval sum of the entire optical system L0 becomes large, so that it becomes difficult to correct the curvature of field. In particular, in the case where the first optical element M1 consists of the first reflective surface R1, it becomes difficult to correct a spherical aberration and curvature of field. On the other hand, if L/f becomes higher than the upper limit of the expression (2), the overall length of the optical system L0 becomes long and it becomes difficult to reduce the size and weight.

The numerical ranges of the expressions (1) and (2) may be set as follows.

$$nM1 \leq 1.680 \tag{1a}$$

$$0.450 \leq L/f \leq 0.750 \tag{2a}$$

The numerical ranges of the expressions (1) and (2) may be set as follows.

$$nM1 \leq 1.670 \tag{1b}$$

$$0.460 \leq L/f \leq 0.720 \tag{2b}$$

When the optical system L0 has the above optical configuration and satisfies the inequalities of the expressions (1) and (2), the optical system L0 can have an autofocus function with a small size, reduced weight, and large aperture ratio, and can sufficiently correct a curvature of field.

Next follows inequalities which the optical system L0 according to each example may satisfy. The optical system L0 according to each example satisfies at least one of the inequalities expressed by the following expressions (3) to (11).

$$0.720 \leq rR1/rR2 \leq 1.450 \tag{3}$$

$$0.340 \leq |dM1M2|/dM1IP \leq 0.720 \tag{4}$$

$$0.380 \leq eamax/L \leq 1.000 \tag{5}$$

$$0.500 \leq dM1IP/L < 1.000 \tag{6}$$

$$0.1290 \leq |dM1M2|/f \leq 0.2500 \tag{7}$$

$$0.0010 \leq \beta L2/f \leq 0.0500 \tag{8}$$

$$-1.200 \leq rR1/f \leq -0.450 \tag{9}$$

$$-1.200 \leq rR2/f \leq -0.350 \tag{10}$$

$$0.020 \leq tmax/L \leq 0.075 \tag{11}$$

In the above expressions, rR1 is a radius of curvature of the first reflective surface R1, rR2 is a radius of curvature of the second reflective surface R2, dM1M2 is a distance on the optical axis between the first reflective surface R1 and the second reflective surface R2, dM1IP is a distances on the optical axis from the first reflective surface R1 to the image plane IP, and eamax is an effective diameter of the optical surface having the largest effective diameter among optical surfaces (including a refractive surface (lens surface) and a reflective surface) included in the optical system L0. βL2 is a lateral magnification of the second lens subunit L2 in the in-focus state on the object at infinity. tmax is a thickness on the optical axis of a lens having the largest thickness among lenses included in the optical system L0.

In the case where no lens surface exists on the optical axis such as a lens having an opening, a position where a reference spherical surface of the lens surface intersects the optical axis is defined as a position (surface vertex) of the lens surface on the optical axis.

Figure 12:
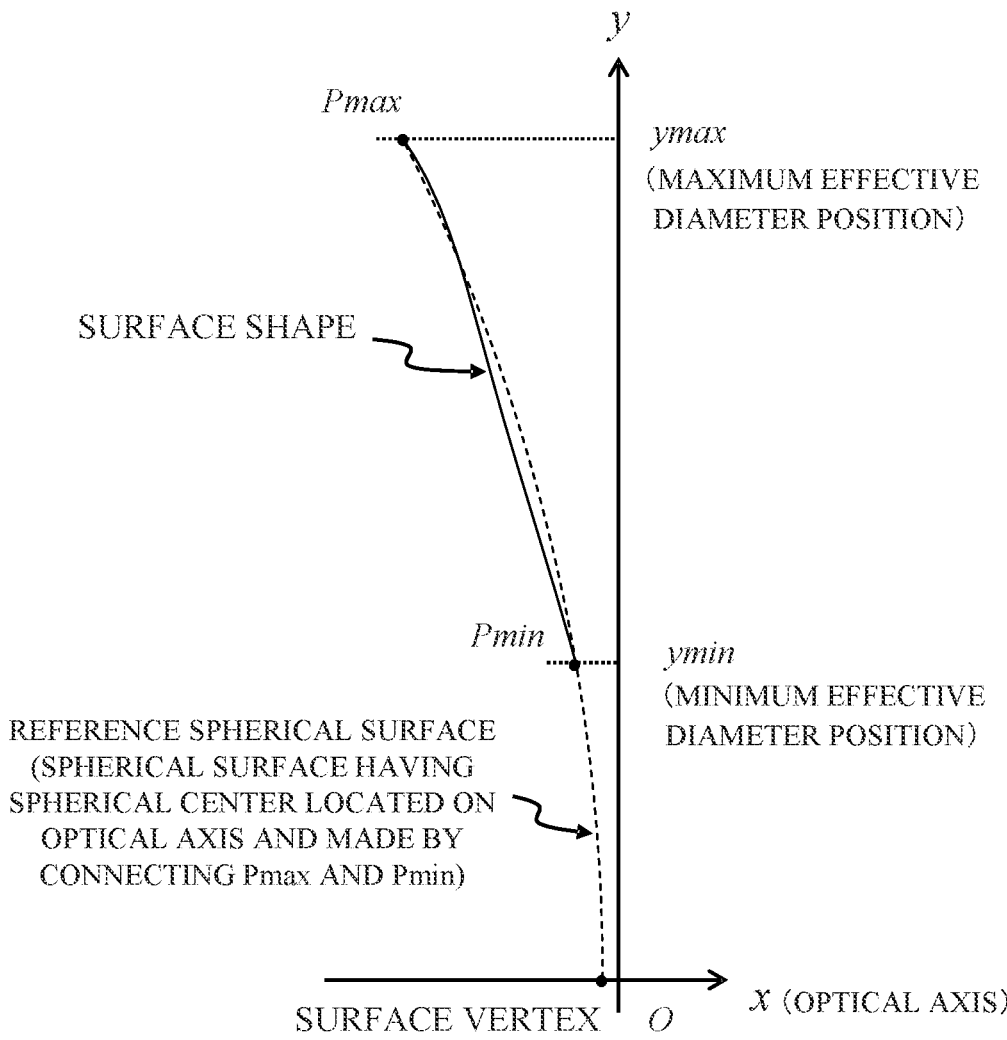
FIG. 12 illustrates a method of calculating a conditional expression for an aspherical shape.

FIG. 12 illustrates a method of calculating a position on the optical axis of a surface vertex that does not exist on the optical axis. As illustrated by a broken line in FIG. 12, a reference spherical surface is a spherical surface having a sphere center located on the optical axis and made by connecting a spherical surface position Pmax corresponding to a maximum effective diameter position ymax and a spherical surface position Pmin corresponding to a minimum effective diameter position ymin. As illustrated in FIG. 12, the position where the reference sphere intersects the optical axis is the position of the surface vertex.

The expression (3) is a condition relating to a relationship between the radius of curvature of the first reflective surface R1 and the radius of curvature of the second reflective surface R2, and is a condition for obtaining good optical performance while reducing the size of the entire optical system L0. If rR1/rR2 is higher than the upper limit of the expression (3), the absolute value of the power of the second reflective surface R2 becomes large, and it becomes difficult to correct the curvature of field. If rR1/rR2 is lower than the lower limit of the expression (3), the power of the first reflective surface R1 becomes large, and it becomes difficult to correct spherical aberration and curvature of field.

The expression (4) is a condition relating to a relationship between the distance on the optical axis between the first reflective surface R1 and the second reflective surface R2 and the distance on the optical axis from the first reflective surface R1 to the image plane IP, and is a condition for obtaining good optical performance while reducing the size and weight of the entire optical system L0. In order to reduce the size and weight of the entire optical system L0, it is particularly necessary to simplify a mechanism for driving the focus lens subunit. Thus, the second unit L2 as a focus lens subunit may be disposed near the object side or on the image side of the first optical element M1. When |dM1M2|/dM1IP is higher than the upper limit of the expression (4), the distance on the optical axis from the first reflective surface R1 to the image plane IP becomes short, and it becomes difficult to dispose the second unit L2 near the object side or on the image side of the first optical element M1 while achieving good optical performance. As a result, the mechanism for driving the second unit L2 becomes complicated, and it becomes difficult to reduce the size of the entire optical system L0. When |dM1M2|/dM1IP is lower than the lower limit of the expression (4), the distance on the optical axis between the first reflective surface R1 and the second reflective surface R2 becomes short, the effective diameter of the second reflective surface R2 becomes consequently larger, and it is difficult to reduce the size of the entire optical system L0.

The expression (5) is a condition relating to a relationship between the maximum effective diameter of the lens surface in the optical system L0 and the overall length of the optical system L0, and is a inequalities for reducing the size and weight of the entire optical system L0. If eamax/L is higher than the upper limit of the expression (5), the maximum effective diameter becomes large and it becomes difficult to reduce the size and weight of the entire optical system L0. If eamax/L is lower than the lower limit of the expression (5), the overall length of the optical system L0 becomes long and the size reduction becomes difficult.

The expression (6) is a condition relating to the relationship between the distance on the optical axis from the first reflective surface R1 to the image plane IP and the overall length of the optical system L0, and is a condition for obtaining good optical performance while reducing the size of the entire optical system L0. When dM1IP/L is higher than the upper limit of the expression (6), the distance on the optical axis from the first reflective surface R1 to the image plane IP becomes long, and the Petzval sum of the first reflective surface R1 and the second reflective surface R2 increases and it becomes difficult to correct the curvature of field. If dM1IP/L is lower than the lower limit of the expression (6), the overall length of the optical system L0 becomes long and the size reduction becomes difficult.

The expression (7) is a condition relating to a relationship between the distance on the optical axis between the first reflective surface R1 and the second reflective surface R2 and the focal length of the optical system L0, and is a condition for obtaining good optical performance while reducing the size and weight of the entire optical system L0. When |dM1M2|/f is higher than the upper limit of the expression (7), the distance on the optical axis from the first reflective surface R1 to the image plane IP becomes short, and it becomes difficult to dispose the second unit L2 near the object side or on the image side of the first optical element M1 while achieving good optical performance. As a result, the mechanism for driving the second unit L2 becomes complicated, and it becomes difficult to reduce the size of the entire optical system L0. When |dM1M2|/f is lower than the lower limit of the expression (7), the absolute value of the power of the first reflective surface R1 and the second reflective surface R2 becomes large, and it becomes difficult to correct a spherical aberration.

The expression (8) is a condition relating to a relationship between the lateral magnification of the second unit L2 and the focal length of the optical system L0 in the in-focus state on the object at infinity, and is a condition for obtaining good optical performance while reducing the size of the entire optical system L0. When βL2/f is higher than the upper limit of the expression (8), the absolute value of the power of the second unit L2 becomes large, and it becomes difficult to correct the spherical aberration during focusing from the object at infinity to the short-distance object. When βL2/f is lower than the lower limit of the expression (8), the position sensitivity of the second unit L2 decreases, and the moving amount of the second unit L2 during focusing between the object at infinity and the short-distance object increases. As a result, it becomes difficult to reduce the size of the entire optical system L0.

The expression (9) is a condition relating to a relationship between the radius of curvature of the first reflective surface R1 and the focal length f of the optical system L0, and is a condition for obtaining good optical performance while reducing the size of the entire optical system L0. If rR1/f is higher than the upper limit of the expression (9), the absolute value of the power of the first reflective surface R1 becomes large, and it becomes difficult to correct the curvature of field. When rR1/f is lower than the lower limit of the expression (9), the absolute value of the power of the first reflective surface R1 becomes small, and it becomes difficult to shorten the overall length of the optical system L0.

The expression (10) is a condition relating to a relationship between the radius of curvature of the second reflective surface R2 and the focal length of the optical system L0, and is a condition for obtaining good optical performance while reducing the size of the entire optical system L0. If rR2/f is higher than the upper limit of the expression (10), the absolute value of the power of the second reflective surface R2 becomes large, and it becomes difficult to correct the curvature of field. When rR2/f is lower than the lower limit of the expression (10), the absolute value of the power of the second reflective surface R2 becomes small, and it becomes difficult to shorten the overall length of the optical system L0.

The expression (11) is a condition relating to a relationship between the maximum thickness of the lens in the optical system L0 and the overall length of the optical system L0, and is a condition for reducing the size and weight of the entire optical system L0. If tmax/L is higher than the upper limit of the expression (11), it becomes difficult to reduce the weight of the optical system L0 by increasing the size of the lens having the maximum thickness. If tmax/L is lower than the lower limit of the expression (11), the entire optical system L0 becomes large and it becomes difficult to reduce the weight.

The numerical ranges of the expressions (3) to (11) may be set as follows.

$$0.750 \leq rR1/rR2 \leq 1.400 \tag{3a}$$

$$0.350 \leq |dM1M2|/dM1IP \leq 0.670 \tag{4a}$$

$$0.390 \leq eamax/L \leq 0.900 \tag{5a}$$

$$0.530 \leq dM1IP/L \leq 0.900 \tag{6a}$$

$$0.1310 \leq |dM1M2|/f \leq 0.2200 \tag{7a}$$

$$0.0018 \leq \beta L2/f \leq 0.0300 \tag{8a}$$

$$-1.150 \leq rR1/f \leq -0.480 \tag{9a}$$

$$-1.150 \leq rR2/f \leq -0.380 \tag{10a}$$

$$0.030 \leq tmax/L \leq 0.070 \tag{11a}$$

The numerical ranges of the expressions (3) to (11) may be set as follows.

$$0.850 \leq rR1/rR2 \leq 1.380 \tag{3b}$$

$$0.390 \leq |dM1M2|/dM1IP \leq 0.650 \tag{4b}$$

$$0.400 \leq eamax/L \leq 0.800 \tag{5b}$$

$$0.550 \leq dM1IP/L \leq 0.800 \tag{6b}$$

$$0.1320 \leq |dM1M2|/f \leq 0.2160 \tag{7b}$$

$$0.0040 \leq \beta L2/f \leq 0.0150 \tag{8b}$$

$$-1.100 \leq rR1/f \leq -0.500 \tag{9b}$$

$$-1.100 \ rR2/f \leq -0.400 \tag{10b}$$

$$0.040 \leq tmax/L \leq 0.065 \tag{11b}$$

In each example, the first unit L1 may have a positive lens to which the light from the object side first enters. Thereby, the correction of the spherical aberration becomes easy and the entire optical system L0 can be made smaller.

At least one positive lens and at least one negative lens may be disposed on the image side of the second unit L2 (or a third unit fixed during focusing on an image side of the second unit). Thereby, it becomes easy to increase the position sensitivity of the second unit L2 as the focus lens subunit, the moving amount of the second unit L0 can be reduced during focusing between the object at infinity and the short-distance object, and the entire optical system L0 can be made smaller.

The first unit L0 may include a lens subunit that transmits light traveling from the second reflective surface R2 toward the second unit L2.

Next follows a description of a more specific configuration according to each example. The optical systems L0 according to Examples 1 to 5 include, in light entering order from the object side, the first unit L1, the second lens subunit L2 as the focusing lens subunit, and a third lens subunit L3.

In the optical systems L0 according to Examples 1 to 3 and 5, the first unit L1 includes, in light entering order from the object side, a positive lens L1P, the first optical element M1 having the first reflective surface R1, and the second optical element having the second reflective surfaces R2. Since the first unit L1 includes the positive lens L1P closest to the object, spherical aberration can be satisfactorily corrected and the entire optical system L0 can be easily made smaller.

In the optical systems L0 according to Examples 1 to 3 and 5, the first optical element M1 is a lens having an opening in the central portion and a back reflective surface in the peripheral portion. Light directed from the second optical element M2 to the second unit L2 passes through the opening in the first optical element M1.

In the optical systems L0 according to Examples 1 and 3, the second optical element M2 consists of the second reflective surface R2.

In the optical system L0 according to Example 4, the first unit L1 includes, in light entering order from the object side, a first optical element M1 having a first reflective surface R1, a second optical element having a second reflective surface R2, and a lens subunit LIL. The first optical element M1 and the second optical element M2 consist of the first reflective surface R1 and the second reflective surface R2, and include no lens. Each of the first reflective surface R1 and the second reflective surface R2 is formed as an aspherical surface so as to satisfactorily correct spherical aberration.

The first unit L1 in each of the optical systems L0 according to Examples 1 to 4 includes a lens subunit LIL that transmits light traveling from the second reflective surface R2 toward the second unit L2. Among them, the lens subunit L1L according to Example 1 includes a positive lens that transmits light from the first optical element M1 to the second optical element M2 and light from the second optical element M2 to the second optical element L2. Thereby, spherical aberration can be easily corrected. The lens subunit L1L according to Examples 1 to 3 includes a positive lens and a negative lens. Thereby, chromatic and spherical aberrations can be satisfactorily corrected. Since the lens subunit L1L includes a positive lens, the position sensitivity of the second unit L2 during focusing can be increased. As a result, the moving amount of the second unit L2 during focusing between the object at infinity and the short-distance object can be reduced, and the entire optical system L0 can be made smaller.

In each of the optical systems L0 according to Examples 1 to 4, the second unit L2 includes a positive lens and a negative lens. Thereby, chromatic aberration can be satisfactorily corrected during focusing between the object at infinity and the short-distance object. On the other hand, in the optical system L0 according to Example 5, the second unit L2 consists of one negative lens for weight reduction.

The optical systems L0 according to Examples 1 to 3 have the third unit L3 disposed on the image side of the second unit L2. The third unit L3 includes a positive lens and a negative lens, and thereby facilitates correction of lateral chromatic aberration. The optical system L0 according to Example 3 can reduce (correct) image shake caused by camera shake or the like by moving the third unit L3 in a direction orthogonal to the optical axis.

The optical system L0 according to Example 3 further includes a fourth unit L4 disposed on the image side of the third unit L3. The fourth unit L4 includes a positive lens and a negative lens, and thereby facilitates correction of lateral chromatic aberration. In addition, the position sensitivity of the second unit L2 during focusing can be increased. As a result, the moving amount of the second unit L2 during focusing between the object at infinity and the short-distance object can be reduced, and the entire optical system L0 can be made smaller.

Numerical examples 1 to 5 will be illustrated below. In surface data of each numerical example, a surface number i indicates a surface order counted from the light incident side. r is a radius of curvature (mm) of the i-th surface, and d is a lens thickness or distance (air gap) (mm) on the optical axis between the i-th and (i+1)-th surfaces. A portion where an interval d is (variable) means that the interval is changed during focusing.

nd is a refractive index of a material of the i-th optical member for the d-line. vd is an Abbe number based on the d-line of the material of the i-th optical member. The Abbe number vd is expressed as follows:

$$vd=(Nd-1)/(NF-NC)$$

where Nd, NF, and NC are refractive indexes of the Fraunhofer line for the d-line (587.6 nm), F-line (486.1 nm), and C-line (656.3 nm).

Each of d, a focal length (mm), an F-number, and a half angle of view (°) has a value when the optical system L0 according to each example is in focus on an object at infinity. BF represents a back focus (mm). The back focus is a distance on the optical axis from the final surface (lens surface closest to the image plane) of the optical system L0 to the image plane in terms of air equivalent length. The overall lens length is a length obtained by adding the back focus to a distance on the optical axis from the frontmost surface (lens surface closest to the object) of the optical system L0 to the final surface.

An asterisk "*" attached to a surface number means that the surface has an aspherical shape. The aspherical shape is expressed as follows:

$$X = \frac{(1/R)}{1 + \sqrt{1 - (1+K)(H/R)^2}} +$$

$$A_2H^2 + A_4H^4 + A_6H^6 + A_8H^8 + A_{10}H^{10} + A_{12}H^{12}$$

where x is a displacement amount from a surface vertex in the optical axis direction, h is a height from the optical axis in the direction orthogonal to the optical axis, R is a paraxial radius of curvature, k is a conical constant, A4, A6, A8, A10, and A12 are aspherical coefficients of respective orders.

"e±X" in the aspherical coefficient means "×10^{±X}."

Table 1 summarizes the values of the inequalities of the expressions (1) to (11) in each numerical example.

Numerical Example 1

| | UNIT: mm | | | |
| | Surface Data | | | |
| Surface No. | r | d | nd | vd |
| --- | --- | --- | --- | --- |
| 1 | 291.972 | 11.41 | 1.59349 | 67.0 |
| 2 | 2085.308 | 57.61 | | |
| 3 | −167.951 | 8.00 | 1.54814 | 45.8 |
| 4 | −260.429 | −8.00 | 1.54814 | 45.8 |
| 5 | −167.951 | −46.25 | | |
| 6 | −462.691 | −4.65 | 1.91650 | 31.6 |
| 7 | −2591.481 | −1.90 | | |
| 8 | −275.113 | 1.90 | | |
| 9 | −2591.481 | 4.65 | 1.91650 | 31.6 |
| 10 | −462.691 | 24.03 | | |
| 11 | 124.843 | 4.35 | 1.53775 | 74.7 |
| 12 | −905.486 | 1.44 | | |
| 13 | −181.246 | 1.84 | 1.88300 | 40.8 |
| 14 | 686.432 | (Variable) | | |
| 15 | 2817.050 | 2.00 | 1.59522 | 67.7 |
| 16 | 58.565 | 11.61 | | |
| 17 | −687.302 | 2.29 | 1.84666 | 23.8 |
| 18 | −200.292 | (Variable) | | |
| 19 | 92.360 | 8.33 | 1.51823 | 58.9 |
| 20 | −96.636 | 0.13 | | |
| 21 | −741.544 | 1.91 | 1.91650 | 31.6 |
| 22 | 182.274 | 65.95 | | |
| Image Plane | ∞ | | | |

| Various data | |
| --- | --- |
| Focal Length | 298.89 |
| Fno | 2.28 |
| Half Angle of View (degree) | 4.14 |
| Image Height | 21.64 |
| Overall lens length | 177.20 |
| BF | 65.95 |

| Object distance | Infinity | −3000 |
| --- | --- | --- |
| d14 | 1.83 | 28.60 |
| d18 | 28.73 | 1.97 |

Numerical Example 2

| | UNIT: mm | | | |
| | Surface Data | | | |
| Surface No. | r | d | nd | vd |
| --- | --- | --- | --- | --- |
| 1 | 556.718 | 6.72 | 1.48749 | 70.2 |
| 2 | −3701.868 | 54.85 | | |
| 3 | −157.006 | 8.00 | 1.48749 | 70.2 |
| 4 | −221.723 | −8.00 | 1.48749 | 70.2 |
| 5 | −157.006 | −46.52 | | |
| 6 | −129.814 | −3.50 | 1.51633 | 64.1 |
| 7 | −165.738 | 3.50 | 1.51633 | 64.1 |
| 8 | −129.814 | 36.29 | | |
| 9 | 37.612 | 3.51 | 1.48749 | 70.2 |
| 10 | 80.984 | 0.26 | | |
| 11 | 30.337 | 2.49 | 1.80518 | 25.4 |
| 12 | 25.645 | (Variable) | | |

-continued

UNIT: mm
Surface Data

| 13 | −187.587 | 2.00 | 1.72916 | 54.7 |
|---|---|---|---|---|
| 14 | 71.979 | 2.81 | | |
| 15 | −118.528 | 2.07 | 1.84666 | 23.8 |
| 16 | −69.665 | (Variable) | | |
| 17 | −178.895 | 5.11 | 1.51823 | 58.9 |
| 18 | −40.203 | 9.87 | | |
| 19 | −37.624 | 1.90 | 1.77250 | 49.6 |
| 20 | −85.338 | 47.69 | | |
| Image Plane | ∞ | | | |

Various data

| Focal Length | 408.04 |
|---|---|
| Fno | 5.00 |
| Half Angle of View (degree) | 3.04 |
| Image Height | 21.64 |
| Overall lens length | 189.17 |
| BF | 47.69 |

| Object distance | Infinity | −3000 |
|---|---|---|
| d12 | 13.84 | 37.02 |
| d16 | 46.31 | 23.19 |

Numerical Example 3

UNIT: mm
Surface Data

| Surface No. | r | d | nd | vd |
|---|---|---|---|---|
| 1 | 241.332 | 9.86 | 1.51633 | 64.1 |
| 9 | 437.456 | 62.27 | | |
| 3 | −193.477 | 8.00 | 1.65844 | 50.9 |
| 4 | −280.017 | −8.00 | 1.65844 | 50.9 |
| 5 | −193.477 | −54.54 | | |
| 6 | −283.331 | 33.13 | | |
| 7 | 75.910 | 10.95 | 1.62280 | 57.0 |
| 8 | −319.014 | 4.21 | | |
| 9 | 79.120 | 6.77 | 1.79360 | 37.1 |
| 10 | 369.318 | 2.32 | | |
| 11 | −406.179 | 2.50 | 1.91082 | 35.3 |
| 12 | 64.547 | (Variable) | | |
| 13 | 148.537 | 1.99 | 1.77250 | 49.6 |
| 14 | 32.155 | 4.34 | 1.80518 | 25.4 |
| 15 | 48.512 | (Variable) | | |
| 16 | 78.723 | 7.06 | 1.74320 | 49.3 |
| 17 | −64.937 | 2.50 | 1.74950 | 35.3 |
| 18 | 226.899 | 12.05 | | |
| 19 | −152.744 | 4.23 | 1.48749 | 70.2 |
| 20 | −63.548 | 1.00 | | |
| 21 | −101.205 | 3.01 | 1.85026 | 32.3 |
| 22 | −163.840 | 60.33 | | |
| Image Plane | ∞ | | | |

Various data

| Focal Length | 290.25 |
|---|---|
| Fno | 2.31 |
| Half Angle of View (degree) | 4.26 |
| Image Height | 21.64 |
| Overall lens length | 202.93 |
| BF | 60.33 |

| Object distance | Infinity | −3000 |
|---|---|---|
| d12 | 4.39 | 24.84 |
| d15 | 24.57 | 4.12 |

Numerical Example 4

UNIT: mm
Surface Data

| Surface No. | r | d | nd | vd |
|---|---|---|---|---|
| 1* | −226.220 | −51.50 | | |
| 2* | −205.541 | 51.50 | | |
| 3 | 221.161 | 7.84 | 1.48749 | 70.2 |
| 4 | −67.360 | 0.40 | | |
| 5 | −66.938 | 2.49 | 1.90366 | 31.3 |
| 6 | −100.826 | (Variable) | | |
| 7 | 631.717 | 3.16 | 1.85478 | 24.8 |
| 8 | −296.661 | 0.92 | | |
| 9 | −187.635 | 2.00 | 1.48749 | 70.2 |
| 10 | 45.925 | (Variable) | | |
| 11 | −127.999 | 3.27 | 1.80400 | 46.5 |
| 12 | −77.656 | 22.57 | | |
| 13 | −902.695 | 6.77 | 1.48749 | 70.2 |
| 14 | −47.597 | 4.20 | | |
| 15 | −47.606 | 2.00 | 1.87070 | 40.7 |
| 16 | −154.492 | 33.57 | | |
| Image Plane | ∞ | | | |

ASPHERICAL DATA

1st Surface

K = −1.00000e+000 A4 = −3.91046e−010 A 6 = −6.37894e−014
2nd Surface

K = 0.00000e+000 A4 = 3.52117e−008 A 6 = −5.58765e−012

Various data

| Focal Length | 298.75 |
|---|---|
| Fno | 2.28 |
| Half Angle of View (degree) | 4.14 |
| Image Height | 21.64 |
| Overall lens length | 168.92 |
| BF | 33.57 |

| Object distance | Infinity | −3000 |
|---|---|---|
| d6 | 1.76 | 19.94 |
| d10 | 26.48 | 8.30 |

Numerical Example 5

UNIT: mm
Surface Data

| Surface No. | r | d | nd | vd |
|---|---|---|---|---|
| 1 | 696.779 | 7.98 | 1.48749 | 70.2 |
| 2 | −393.230 | 52.01 | | |
| 3 | −119.528 | 7.98 | 1.45867 | 67.9 |
| 4 | −205.681 | −7.98 | 1.45867 | 67.9 |
| 5 | −119.528 | −38.20 | | |
| 6 | −101.866 | −5.81 | 1.51823 | 58.9 |
| 7 | −178.838 | 5.81 | 1.51823 | 58.9 |
| 8 | −101.866 | 38.20 | | |
| 9 | −119.528 | 7.98 | 1.45867 | 67.9 |
| 10 | −205.681 | (Variable) | | |
| 11 | 914.008 | 1.99 | 1.59522 | 67.7 |
| 12 | 54.072 | (Variable) | | |
| 13 | 727.391 | 4.85 | 1.67270 | 32.1 |
| 14 | −44.061 | 1.17 | 1.83400 | 37.2 |
| 15 | 148.718 | 6.98 | | |
| 16 | 110.665 | 5.48 | 1.58913 | 61.1 |
| 17 | −78.286 | 77.79 | | |
| Image Plane | ∞ | | | |

13

-continued

UNIT: mm
Surface Data

Various data

| Focal Length | 387.15 |
| Fno | 5.00 |
| Half Angle of View (degree) | 3.20 |
| Image Height | 21.64 |
| Overall lens length | 197.84 |
| BF | 77.79 |

| Object distance | Infinity | −3000 |
| d10 | 1.71 | 26.59 |
| d12 | 29.91 | 5.03 |

TABLE 1

| | | Example | | | | |
| --- | --- | --- | --- | --- | --- | --- |
| | | 1 | 2 | 3 | 4 | 5 |
| Cond. Exp. 1 | nM1 | 1.5481 | 1.4875 | 1.6584 | 1.0000 | 1.4587 |
| Cond. Exp. 2 | L/f | 0.593 | 0.464 | 0.699 | 0.565 | 0.511 |
| Cond. Exp. 3 | rR1/rR2 | 0.947 | 1.338 | 0.988 | 1.101 | 1.150 |
| Cond. Exp. 4 | \|dM1M2\|/dM1IP | 0.607 | 0.485 | 0.509 | 0.439 | 0.400 |
| Cond. Exp. 5 | eamax/L | 0.738 | 0.431 | 0.402 | 0.775 | 0.635 |
| Cond. Exp. 6 | dM1IP/L | 0.565 | 0.632 | 0.605 | 0.695 | 0.656 |
| Cond. Exp. 7 | \|dM1M2\|/f | 0.2034 | 0.1422 | 0.2155 | 0.1724 | 0.1343 |
| Cond. Exp. 8 | β L2/f | 0.0069 | 0.0051 | 0.0112 | 0.0068 | 0.0067 |
| Cond. Exp. 9 | rR1/f | −0.871 | −0.543 | −0.965 | −0.757 | −0.531 |
| Cond. Exp. 10 | rR2/f | −0.920 | −0.406 | −0.976 | −0.688 | −0.462 |
| Cond. Exp. 11 | tmax/L | 0.064 | 0.042 | 0.054 | 0.046 | 0.040 |

Image Pickup Apparatus

Figure 11:
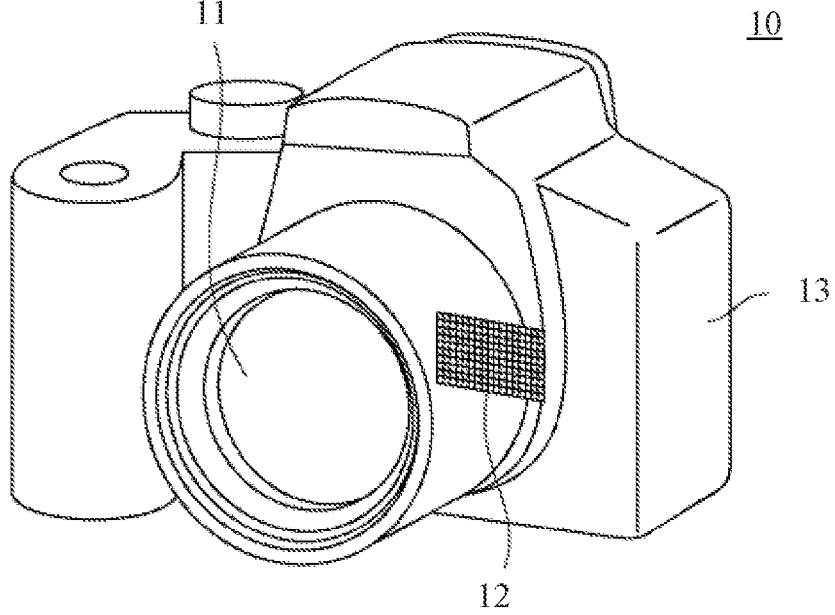
FIG. 11 is a schematic view of an image pickup apparatus.

FIG. 11 illustrates a digital still camera (image pickup apparatus) using the optical system L0 according to each of the above examples as an imaging optical system. In FIG. 11, reference numeral 10 denotes a camera body, and reference numeral 11 denotes an imaging optical system that includes the optical system L0 according to any one of Examples 1 to 5. Reference numeral 12 denotes a solid-state image sensor (photoelectric conversion element), such as a CCD sensor or a CMOS sensor, which is built in the camera body and photoelectrically converts an optical image formed by the imaging optical system 11. The camera body 10 may be a single-lens reflex camera having a quick turn mirror, or a mirrorless (non-reflex) camera having no quick turn mirror.

Thus, applying the optical system L0 according to each example to the image pickup apparatus can provide a compact and lightweight image pickup apparatus having good optical performance.

Each example can provide a compact and lightweight optical system having a large aperture ratio, which can sufficiently correct a curvature of field.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-117655, filed on Jul. 16, 2021, which is hereby incorporated by reference herein in its entirety.

14

What is claimed is:

1. An optical system comprising:
a first unit fixed during focusing;
a second unit configured to move during focusing; and
a third unit fixed during focusing on an image side of the second unit,
wherein the first unit includes:
a first optical element having a first reflective surface that has a concave shape toward an object side; and
a second optical element having a second reflective surface that has a convex shape toward the image side,
wherein the second unit includes a negative lens having a concave shape toward the image side,
wherein light incident on the optical system from an object is reflected by the first reflective surface, thereafter is reflected by the second reflective surface, and thereafter passes through the second unit, and
wherein the following inequalities are satisfied:

$$nM1 \leq 1.690$$

$$0.440 \leq L/f \leq 0.800$$

where nM1 is a refractive index of the first optical element for d-line, L is a distance on an optical axis from a surface closest to the object of the optical system to the image plane, and f is a focal length of the optical system.

2. The optical system according to claim 1, wherein the following inequality is satisfied:

$$0.720 \leq rR1/rR2 \leq 1.450$$

where rR1 is a radius of curvature of the first reflective surface, and rR2 is a radius of curvature of the second reflective surface.

3. The optical system according to claim 1, wherein the following inequality is satisfied:

$$0.340 \leq |dM1M2|/dM1IP \leq 0.720$$

where dM1M2 is a distance on the optical axis between the first reflective surface and the second reflective surface, and dM1IP is a distance on the optical axis from the first reflective surface to the image plane.

4. The optical system according to claim 1, wherein the following inequality is satisfied:

$$0.380 \leq eamax/L \leq 1.000$$

where eamax is an effective diameter of an optical surface having the largest effective diameter among optical surfaces included in the optical system.

5. The optical system according to claim 1, wherein the following inequality is satisfied:

$$0.500 \leq dM1IP/L < 1.000$$

where dM1IP is a distance on the optical axis from the first reflective surface to the image plane.

6. The optical system according to claim 1, wherein the following inequality is satisfied:

$$0.1290 \le |dM1M2|/f \le 0.2500$$

where dM1M2 is a distance on the optical axis between the first reflective surface and the second reflective surface.

7. The optical system according to claim 1, wherein the following inequality is satisfied:

$$0.0010 \le \beta L2/f \le 0.0500$$

where $\beta L2$ is a lateral magnification of the second unit in an in-focus state at infinity.

8. The optical system according to claim 1, wherein the following inequality is satisfied:

$$-1.200 \le rR1/f \le -0.450$$

where rR1 is a radius of curvature of the first reflective surface.

9. The optical system according to claim 1, wherein the following inequality is satisfied:

$$-1.200 \le rR2/f \le -0.350$$

where rR2 is a radius of curvature of the second reflective surface.

10. The optical system according to claim 1, wherein the following inequality is satisfied:

$$0.020 \le tmax/L \le 0.075$$

where tmax is a thickness of a lens having the largest thickness on the optical axis among lenses included in the optical system.

11. The optical system according to claim 1, wherein the first unit includes a positive lens which the light from the object first enters.

12. The optical system according to claim 1, wherein third unit includes a positive lens and a negative lens.

13. The optical system according to claim 1, wherein the first unit includes a lens subunit transmits light traveling from the second reflective surface to the second unit, and wherein the lens subunit includes a positive lens.

14. The optical system according to claim 1, wherein the following inequality is satisfied:

$$1.000 \le nM1 \le 1.690.$$

15. An optical apparatus comprising:

an optical system; and a holding member configured to hold the optical system, wherein the optical system includes a first unit fixed during focusing;

a second unit configured to move during focusing; and a third unit fixed during focusing on an image side of the second unit, wherein the first unit includes:

a first optical element having a first reflective surface that has a concave shape toward an object side; and a second optical element having a second reflective surface that has a convex shape toward the image side, wherein the second unit includes a negative lens having a concave shape toward the image side, wherein light incident on the optical system from an object is reflected by the first reflective surface, thereafter is reflected by the second reflective surface, and thereafter passes through the second unit, and wherein the following inequalities are satisfied:

$$nM1 \le 1.690$$

$$0.440 \le L/f \le 0.800$$

where nM1 is a refractive index of the first optical element for d-line, L is a distance on an optical axis from a surface closest to the object of the optical system to the image plane, and f is a focal length of the optical system.

16. The optical apparatus according to claim 15, wherein the following inequality is satisfied:

$$1.000 \le nM1 \le 1.690.$$

17. An image pickup apparatus comprising:

an optical system; and an image sensor configured to image an object via the optical system, a first unit fixed during focusing;

a second unit configured to move during focusing; and a third unit fixed during focusing on an image side of the second unit, wherein the first unit includes:

a first optical element having a first reflective surface that has a concave shape toward an object side; and a second optical element having a second reflective surface that has a convex shape toward the image side, wherein the second unit includes a negative lens having a concave shape toward the image side, wherein light incident on the optical system from an object is reflected by the first reflective surface, thereafter is reflected by the second reflective surface, and thereafter passes through the second unit, and wherein the following inequalities are satisfied:

$$nM1 \le 1.690$$

$$0.440 \le L/f \le \mathbf{0.800}$$

where nM1 is a refractive index of the first optical element for d-line, L is a distance on an optical axis from a surface closest to the object of the optical system to the image plane, and f is a focal length of the optical system.

18. The image pickup apparatus according to claim 17, wherein the following inequality is satisfied:

$$1.000 \le nM1 \le 1.690.$$

* * * * *